(12) United States Patent
Hriljac et al.

(10) Patent No.: US 11,708,985 B2
(45) Date of Patent: Jul. 25, 2023

(54) SYSTEM AND METHOD FOR CONFIGURING, COMMISSIONING AND TROUBLESHOOTING AN HVAC UNIT

(71) Applicant: Siemens Industry, Inc., Alpharetta, GA (US)

(72) Inventors: Jeffrey Hriljac, Port Barrington, IL (US); Jibo Liu, Long Grove, IL (US); Steven Brens, Niles, IL (US); Ariane Roberson, Chicago, IL (US); Sandeep Billa, Schaumburg, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 115 days.

(21) Appl. No.: 17/185,241

(22) Filed: Feb. 25, 2021

(65) Prior Publication Data

US 2022/0268470 A1 Aug. 25, 2022

(51) Int. Cl.
*F24F 11/63* (2018.01)
*F24F 11/38* (2018.01)
(Continued)

(52) U.S. Cl.
CPC .............. *F24F 11/38* (2018.01); *F24F 11/33* (2018.01); *F24F 11/39* (2018.01); *F24F 11/41* (2018.01);
(Continued)

(58) Field of Classification Search
CPC ............ G05B 2219/2614; G05B 15/02; G05B 19/042; G05B 2219/2642;
(Continued)

(56) References Cited

U.S. PATENT DOCUMENTS 7,640,761 B2 * 1/2010 Garrett ..................... F24F 11/77
700/282
9,430,429 B2 * 8/2016 Liu ........................ G06F 13/385
(Continued)

OTHER PUBLICATIONS

Methods for automated and continuous commissioning of building systems L Luskay, M Brambley, S Katipamula—2003—osti.gov (Year: 2003).*
PCT Search Report dated Jun. 1, 2022, for PCT Application PCT/US2022/015550, 12 pages.

*Primary Examiner* — Darrin D Dunn

(57) ABSTRACT

There is described a system and method for configuring, commissioning and troubleshooting an HVAC unit. A unit type configuration is established based on a type of HVAC system and temperature data, humidity data, and/or indoor air quality data. A fan configuration is established based on whether a variable frequency drive fan is identified. Cooling and heating stage configurations are established based on a compressor parameter and a heating stage parameter. An available auxiliary termination is identified in response to establishing the configurations. A safety is assigned to the available auxiliary termination in response to identifying the available auxiliary termination. An IO table is provided to an HVAC controller, which includes physical input/output assignments for the terminations of the HVAC controller based on the configurations and the assigned safety. For another embodiment, the fan configuration is established based on one of a traditional stage blower fan or variable frequency drive fan.

8 Claims, 16 Drawing Sheets

(51) Int. Cl.
*F24F 11/39* (2018.01)
*F24F 11/41* (2018.01)
*F24F 11/33* (2018.01)
*F24F 110/20* (2018.01)
*F24F 110/50* (2018.01)
*F24F 110/10* (2018.01)
*F24F 11/49* (2018.01)

(52) U.S. Cl.
CPC ............ *F24F 11/63* (2018.01); *F24F 11/49* (2018.01); *F24F 2110/10* (2018.01); *F24F 2110/20* (2018.01); *F24F 2110/50* (2018.01); *G05B 2219/2614* (2013.01)

(58) Field of Classification Search
CPC . G05B 2219/25056; G05B 2219/23406; F24F 11/64; F24F 11/30; F24F 11/56; F24F 11/54; F24F 11/65
See application file for complete search history.

(56) References Cited

U.S. PATENT DOCUMENTS

| | | | |
|---|---|---|---|
| 9,960,962 B2* | 5/2018 | Hamber | H04L 41/0803 |
| 10,801,765 B2* | 10/2020 | Hung | F24F 11/00 |
| 2005/0040249 A1* | 2/2005 | Wacker | H04L 43/50 |
| | | | 236/51 |
| 2008/0223943 A1* | 9/2008 | Mulhouse | F24F 11/63 |
| | | | 236/49.3 |
| 2008/0235346 A1* | 9/2008 | Wei | H04L 43/0852 |
| | | | 709/211 |
| 2011/0018472 A1 | 1/2011 | Rockenfeller et al. | |
| 2013/0226316 A1* | 8/2013 | Duchene | G05B 19/0426 |
| | | | 700/17 |
| 2014/0323030 A1* | 10/2014 | Rugge | F24F 11/74 |
| | | | 454/256 |
| 2020/0050753 A1 | 2/2020 | Davis et al. | |
| 2021/0372884 A1* | 12/2021 | Wang | F24F 11/52 |

\* cited by examiner

Standard Conventional

- Compressor 1
  - Run Enable — DO1
  - Run Status Optional — X9
- Compressor 2
  - Run Enable — DO2
  - Run Status Optional — X10
- Compressor 3
  - Run Enable — DO3
  - Run Status Optional — X11
- Capacity Input

[Finish Cooling Configuration]
Configure Cooling Later

Cooling Settings

| Setting | Value |
|---|---|
| Stage Cooling Delay | 5 min |
| Compressor Min On | 3 min |
| Compressor Min Off | 3 min |
| Economizer Delay | 30 min |

[Save Settings]

Configuration

Economizer Mode
1/4

○ None
No Economizer

○ Single Dry Bulb
Outside Air Temperature

○ Differential Dry Bulb
Outside & Return
Air Temperature

○ Single Enthalpy
Outside Air Temperature &
Outside Air Humidity

⦿ Differential Enthalpy
Return & Outside Air
Temperature, Return & Outside
Air Humidity

[ Finish Economizer Mode ]

Configure Economizer Mode Later

Configuration

Damper Actuator
2/4

○ None

⦿ Modulating Damper

| Damper Command Signal AO | X5 |
| Damper Feedback AI Optional | X6 |

[ Save Damper Configuration ]

Configure Damper Actuator Later

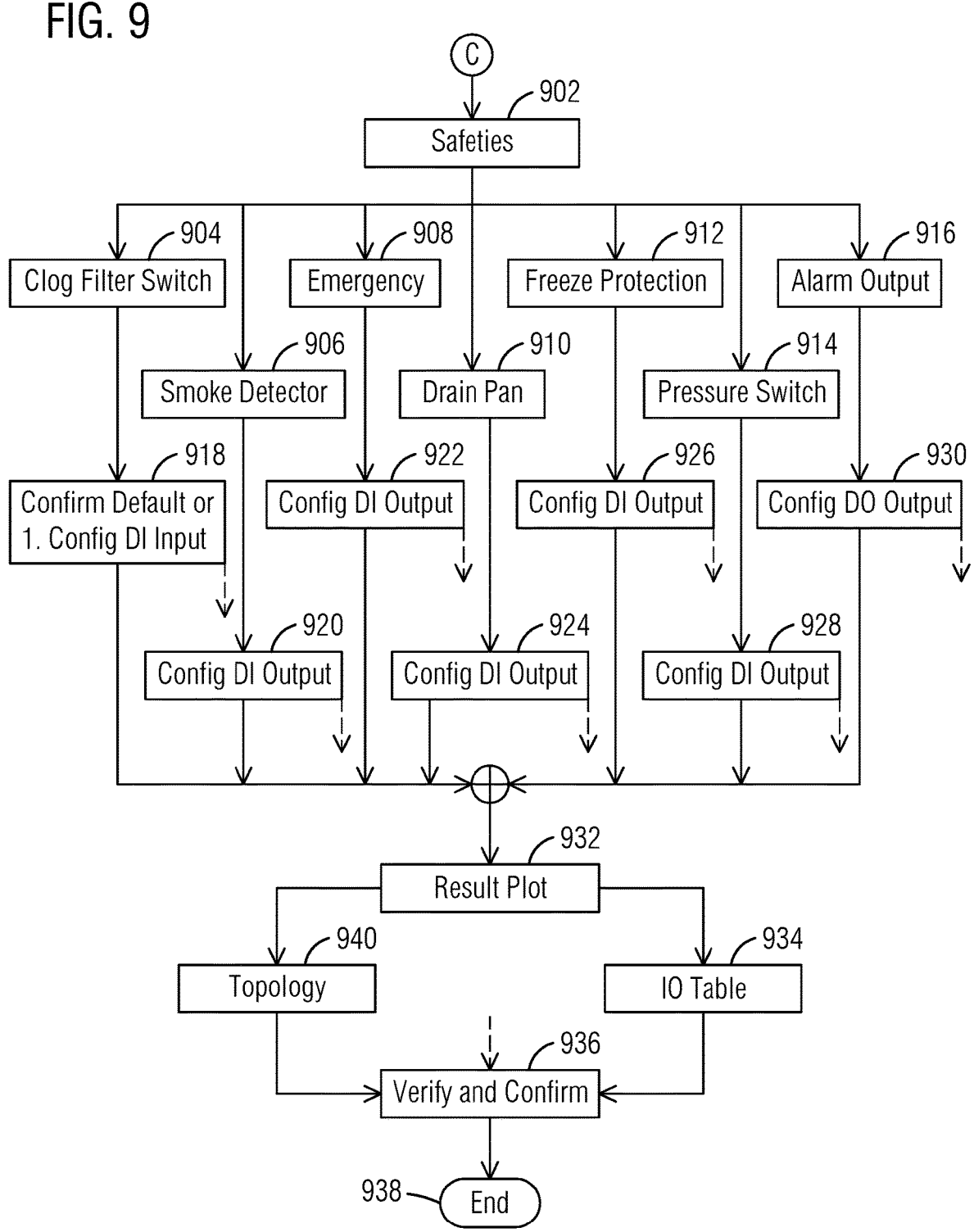

SYSTEM AND METHOD FOR CONFIGURING, COMMISSIONING AND TROUBLESHOOTING AN HVAC UNIT

FIELD OF THE INVENTION

This application relates to the field of HVAC installation and maintenance and, more particularly, to a method for configuring, commissioning and troubleshooting HVAC equipment and variable frequency drives with a mobile application.

BACKGROUND

Building management systems encompass a wide variety of systems that aid in the monitoring and control of various aspects of building operation. Building management systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. An environmental control system may include a rooftop unit to allow fresh air external to the building to circulate through the HVAC components and cool the environmental conditions of the building in an efficient manner.

For conventional approaches, technicians and engineers need to be on-site with the HVAC equipment and require laptop-based tools to commission and checkout HVAC equipment. This type of approach requires manual steps to select and configure each point, device, parameters and setpoints for the startup of the equipment. These conventional approaches may cause inaccuracies of the equipment configuration and increase installation and troubleshooting time, such as re-work to correct issues. In addition, technicians of HVAC equipment do not always have access to laptops and their associated software for the configuration of each HVAC unit. The overall cost of installation (time, wiring, etc) increases which poses problems for HVAC equipment owners and their contractors.

SUMMARY

In accordance with one embodiment of the disclosure, there is provided a configuring, commissioning and troubleshooting approach for HVAC equipment and variable frequency drives with a mobile application. The mobile application eliminates the need for a conventional laptop-based program, and the user experience is based on a workflow that simplifies the startup of HVAC equipment. The workflow categorizes the content and guides the user through a series of simple questions for each device and peripheral setup.

One aspect is a method for configuring, commissioning and troubleshooting an HVAC unit. A unit type configuration is established based on a type of HVAC system and at least one of temperature data, humidity data, or indoor air quality data. A fan configuration is established based on whether a variable frequency drive fan is identified. Cooling and heating stage configurations are established based on one or more compressor parameters and one or more heating stage parameters. One or more available auxiliary terminations are identified in response to establishing the unit type configuration, the fan configuration, and the cooling and heating stage configuration. One or more safeties are assigned to the available auxiliary termination(s) in response to identifying the available auxiliary termination(s). An IO table is provided to an HVAC controller, the IO table including physical input/output assignments for the terminations of the HVAC controller based on one or more configurations and the assigned safety or safeties.

Another aspect is a system for configuring, commissioning and troubleshooting an HVAC unit comprising a mobile device. The mobile device is configured to establish a unit type configuration based on a type of HVAC system and one or more of temperature data, humidity data, or indoor air quality data. The mobile device is configured to establish a fan configuration based on whether a variable frequency drive fan is identified. The mobile device is configured to establish cooling and heating stage configurations based on one or more compressor parameters and one or more heating stage parameters. The mobile device is configured to identify one or more available auxiliary terminations based on the unit type configuration, the fan configuration, and the cooling and heating stage configuration. The mobile device is configured to assign one or more safeties to the available auxiliary termination(s) based on the available auxiliary termination(s). The mobile device is configured to provides an IO table to an HVAC controller, the IO table including physical input/output assignments for the terminations of the HVAC controller based on one or more configurations and the assigned safety or safeties.

Yet another aspect is another method for configuring, commissioning and troubleshooting an HVAC unit. A unit type configuration is established based on a type of HVAC system and one or more of temperature data, humidity data, or indoor air quality data. A fan configuration is established based on one of a traditional stage blower fan or a variable frequency drive fan. Cooling and heating stage configurations are established based on one or more compressor parameters and one or more heating stage parameters. An IO table is provided to an HVAC controller, the IO table including physical input/output assignments for the terminations of the HVAC controller based on one or more configurations.

Still another aspect is another system comprising a mobile device. The mobile device is configured to establish a unit type configuration based on a type of HVAC system and one or more of temperature data, humidity data, or indoor air quality data. The mobile device is configured to establish a fan configuration based on one of a traditional stage blower fan or a variable frequency drive fan. The mobile device is configured to establish cooling and heating stage configurations based on one or more compressor parameters and one or more heating stage parameters. The mobile device is configured to provide an IO table to an HVAC controller, the IO table including physical input/output assignments for the terminations of the HVAC controller based on one or more configurations.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 6A through 6E are screen views illustrating certain operations of FIG. 5.

FIGS. 8A through 8F are screen views illustrating certain operations of FIG. 7.

FIG. 9 is a flow diagram of a fourth portion of the example process of the mobile application executed by the mobile device of FIG. 1.

DETAILED DESCRIPTION

Figure 1:
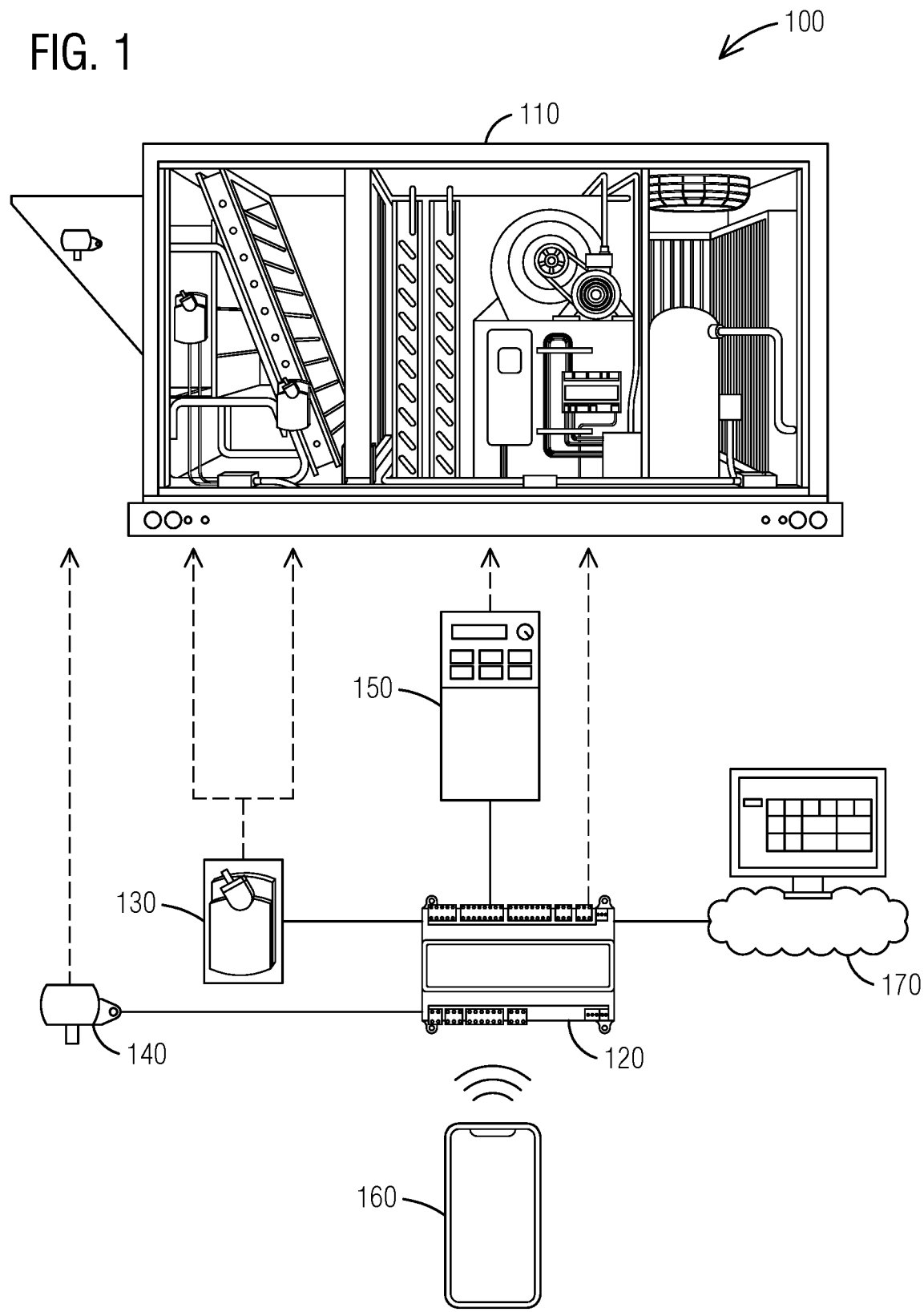
FIG. 1 is an illustration of an environmental control system in an example implementation that is operable to employ techniques described herein.

Various technologies that pertain to systems and methods that facilitate, with a mobile application, configuring, commissioning and troubleshooting of HVAC equipment and variable frequency drives will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The system for configuring, commissioning and troubleshooting reduces the overall installed cost (time and rework) of the HVAC equipment. The system includes a mobile application performing automated operations to streamline the commissioning process. For this system, the vast majority of users only need to enter the simplest information and verify recommended setting defaults. Within the mobile application, settings are pre-configured according to the specific equipment and unique user experiences. Technicians are guided through a simple series of questions that allow them to complete accurate configuration and startup of the HVAC equipment in a minimal amount of time. The overall workflow enhancement and user experience shortens the training and installation time from weeks to hours and enables an installer or other technician to troubleshoot the equipment quickly and efficiently.

In addition, the mobile application provides a unique way of configuring an HVAC fan with integration of a variable frequency drive ("VFD"). The mobile application, and its supporting system, reduces the needed number of parameters to be configured from hundreds to less than a dozen by utilizing a controller-centric approach to the variables of the drive.

Referring to FIG. 1, there is shown an illustration of an environmental control system 100 in an example implementation that is operable to employ techniques described herein. An environmental control system 100 of a building manages heating, ventilation, and air conditioning (HVAC) components to control environmental conditions within the building. The system 100 may include a rooftop unit 110 for allowing fresh air external to the building to circulate through the HVAC components and cool the environmental conditions of the building in an efficient manner. A logic controller 120 of the rooftop unit 110 operates in conjunction with other HVAC components to provide configuring, commissioning and troubleshooting functions for the system 100. The HVAC components of the rooftop unit 110 includes heating and/or cooling coils that modify, if necessary, the temperature of return air to generate supply air for the building. The rooftop unit 110 also includes a outside and return air dampers controlled by damper actuators 130 to manage the amount of outside air entering the system and return air continuing through the duct system. The logic controller 120 of the rooftop unit 110 controls the outside and return damper actuators 130 based on monitoring and control components 140 to manage various aspects of the configuring, commissioning and troubleshooting functions of the system 100. For example, the monitoring and control components 140 may include an outside temperature sensor to provide data for control of the mixed air, i.e., mixture of outside air and return air, circulated through the system 100, thus facilitating fault detection and diagnostics. Examples of monitoring and control components 140 include, but are not limited to, an outdoor temperature sensor, a mixed air temperature sensor, a discharge air temperature sensor, an air differential pressure filter, and a demand control ventilation device.

In addition to the damper actuators 130 and monitoring and control components 140, the logic controller 120 operates with other HVAC components to commission and troubleshoot the environmental control system 100. In particular, the rooftop unit 110 may include a variable frequency drive controller 150 to manage fan efficiency, a mobile device 160 to support a mobile application and control the logic controller 120, and a cloud device 170 to provide additional functions to the logic controller, such as multi-site monitoring, fault detections & diagnostics, and alarm functions.

The mobile device 160 provides simple setup and control of the logic controller 120. The mobile device 160 communicates with the logic controller 120 via a communication link, such as a secure wireless socket or direct connection, and automates a process selection and configuration for each device, and greatly simplifying the commissioning of HVAC equipment and maximizes accuracy of the configuration. The mobile application of the mobile device 160 recognizes the other devices and optimizes the default settings of a solution to apply correct settings and parameters. For some embodiments, the mobile application may also scan a QR, barcode, or unit nameplate to determine unit profile/nomenclature which may facilitate automatica configuration of the rooftop unit 110 or other device of the environmental control system 100.

The mobile device 160 communicates with the cloud device 170 which, among other things, to provide schedule updates, setpoints and site parameters, and viewing live data and point history. The mobile application of the mobile device 160 may also push notifications to alert users of any fault detection or alarms. These features enhance the performance of the HVAC equipment and give the user, such as a technician, the ability to do remote monitoring and troubleshooting.

The mobile device 160 operates with the logic controller 120 to commission and troubleshoot the environmental control system 100. For some embodiments, the mobile device identifies one or more available auxiliary terminations and assigns one or more safeties to the available auxiliary terminations based on the available auxiliary terminations. For other embodiments, the mobile device is configured to establish a fan configuration based on one of a traditional stage blower fan or a variable frequency drive fan. For these embodiments, the mobile device 160 provides an IO table to an HVAC controller, which is an important aspect of the configuring, commissioning and troubleshooting functions of the environmental control system 100.

Figure 2:
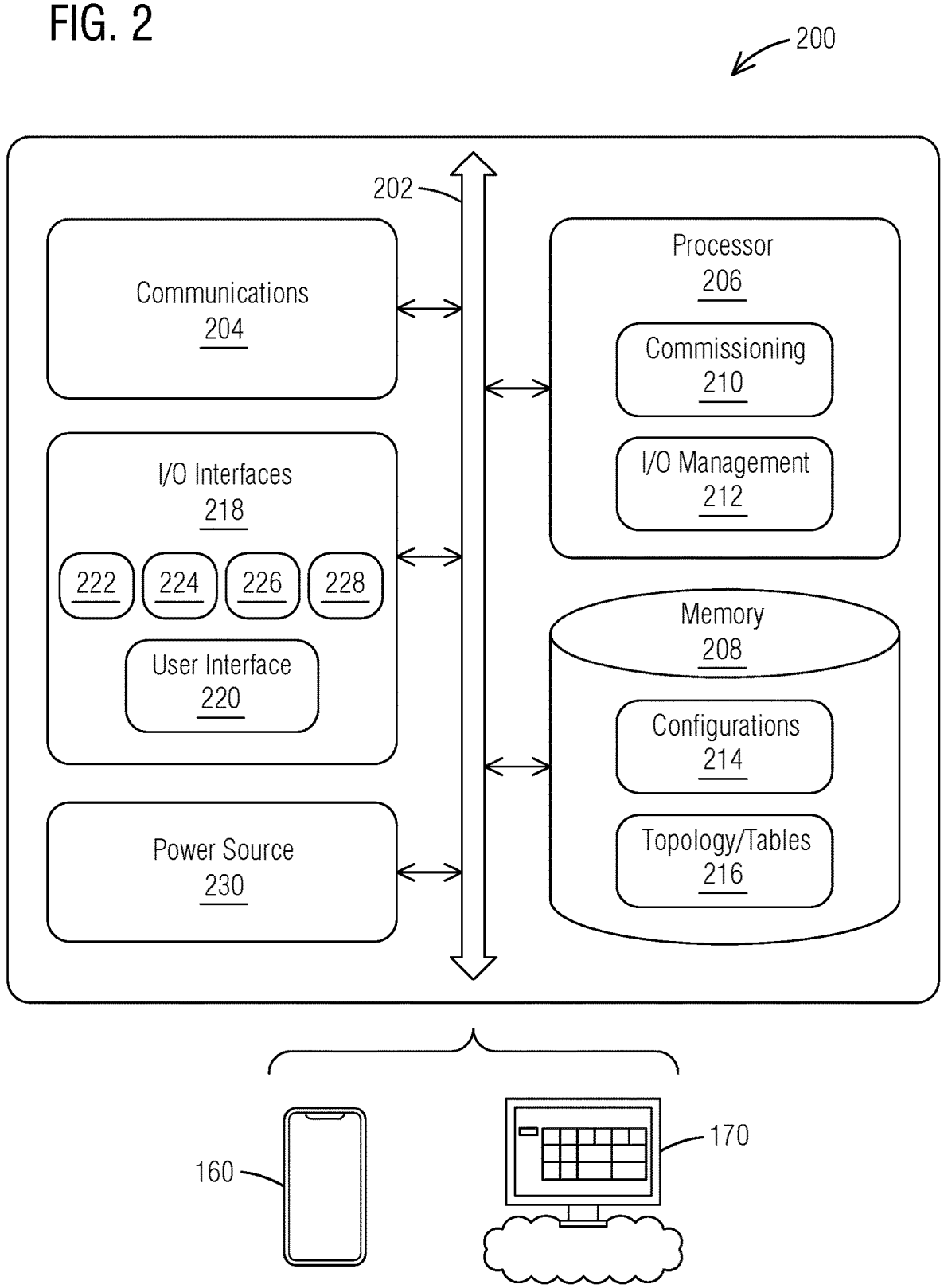
FIG. 2 a block diagram of an example implementation representing either the mobile device or the cloud device of FIG. 1.

FIG. 2 represents an example mobile device or cloud device 200 of an environmental control system 100. The mobile or cloud device 200 may be any type of configuring, commissioning and/or troubleshooting device that may generate and/or otherwise configure IO tables for the logic controller 120. The mobile or cloud device 200 comprises a communication bus 202 for interconnecting the other device components directly or indirectly, one or more communication components 204 communicating other entities via a wired and/or wireless network, one or more processors 206, and one or more memory components 208.

The communication component 204 may utilize wireless technology for communication, such as, but are not limited to, cellular-based communications, Bluetooth (including BLE), ultrawide band (UWB), Wi-Fi (including Wi-Fi Direct), IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. For example, a Wi-Fi stick may be plugged in to the logic controller 120 of the environmental control system 100, temporarily or permanently, to provide communications between the mobile or cloud device 200 and the logic controller. The communication component 204 of the mobile or cloud device 200 may also utilize wired technology for communication, such as transmission of data over a physical conduit, e.g., an electrical cable or optical fiber cable.

The one or more processors 206 may execute code and process data received at other components of the mobile or cloud device 200, such as information received at the communication component 204 or stored at the memory component 208. The code associated with the floor selection system 100 and stored by the memory component 208 may include, but is not limited to, operating systems, applications, modules, drivers, and the like. An operating system includes executable code that controls basic functions of the mobile or cloud device 200, such as interactions among the various components of the mobile or cloud device, communication with external devices via the communication component 204, and storage and retrieval of code and data to and from the memory component 208. Each application includes executable code to provide specific functionality for the processor 206 and/or remaining components of the mobile or cloud device 200. Examples of applications executable by the processor 206 include, but are not limited to, a commissioning module 210 for managing installation and setup operations of the logic controller 120, and an IO management module 212 for generating or otherwise configuring IO tables for the logic controller 120. Data is information that may be referenced and/or manipulated by an operating system or application for performing functions of the mobile or cloud device 200. Examples of data associated with the configuring, commissioning and/or troubleshooting and stored by the memory component 208 may include, but are not limited to, configuration data 214 including unit type, fan, cooling and heating stage, and supplemental configurations, and one or more IO tables 216 generated by the processor 206 based on the configuration data. For some embodiments, the processor 206 may also generate and otherwise provide a topology of the environmental control system 100 based on the configuration data 214.

The mobile or cloud device 200 may further comprise one or more input and/or output components 218 ("I/O interfaces"). A user interface 220 of the mobile or cloud device 200 may include portions of the input and/or output components 218 and be used to interact with a user of the mobile or cloud device. For example, the user interface 220 may include a combination of hardware and software to provide a user with a desired user experience, such as an intuitive visualization and transparency for the configuring, commissioning and/or troubleshooting processes. The input and output components 218 may include other components 222-228 to facilitate configuring, commissioning and/or troubleshooting functions of the system 100, such as an HVAC sensor 222, an HVAC controller 224, a display 226, an audio alarm 228, and the like.

The mobile or cloud device 200 may further comprise a power source 230, such as a power supply or a portable battery, for providing power to the other device components of the mobile or cloud device 200.

It is to be understood that FIG. 2 is provided for illustrative purposes only to represent examples of the internal components of the mobile or cloud device 200 and is not intended to be a complete diagram of the various components that may be utilized by the device. Therefore, the mobile or cloud device 200 may include various other components not shown in FIG. 2, may include a combination of two or more components, or a division of a particular component into two or more separate components, and still be within the scope of the present invention.

Figure 3:
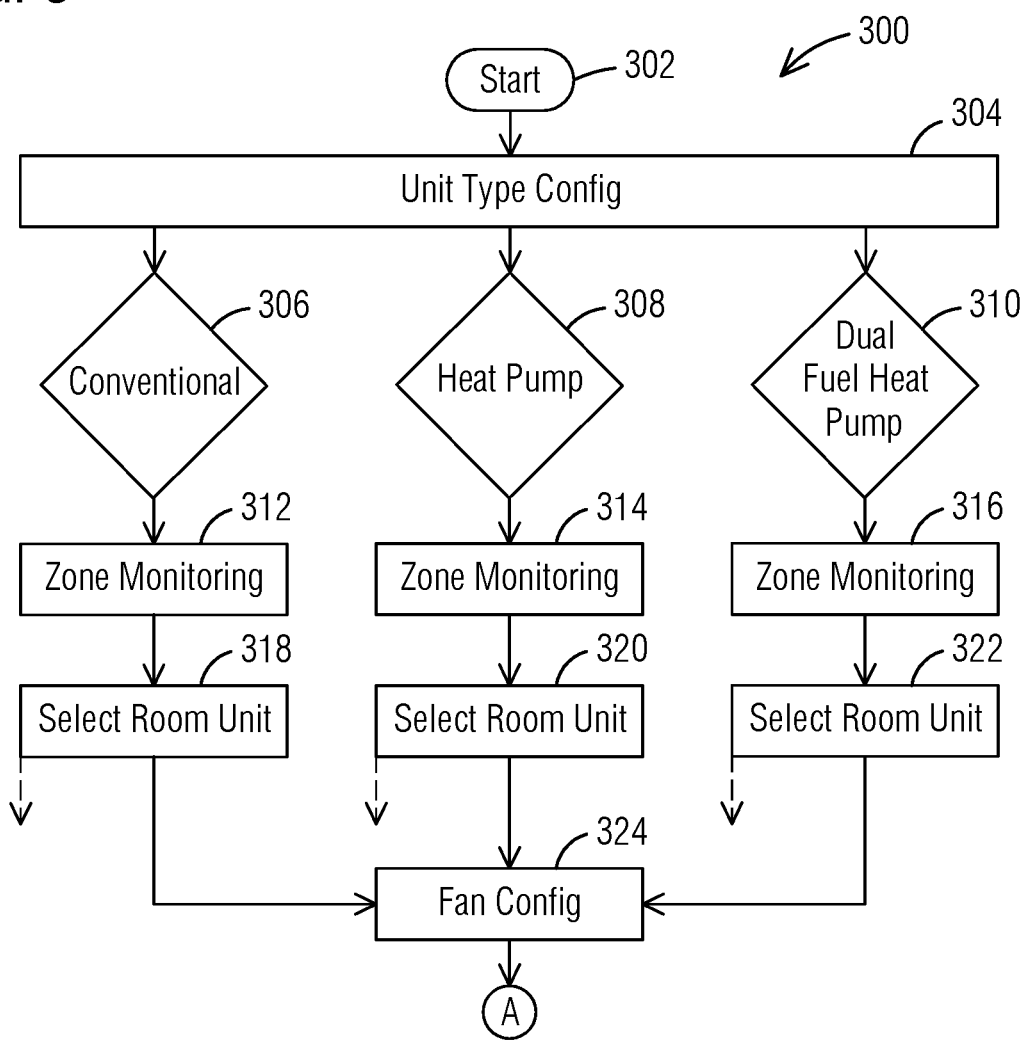
FIG. 3 is a flow diagram of a first portion of an example process of a mobile application executed by the mobile device of FIG. 1.

Referring to FIG. 3, there is shown a flow diagram of a first portion 300 of an example process of a mobile application executed by the mobile device. The example process is shown and described as a workflow implemented illustrated by FIGS. 3, 5, 7, and 9 (described below). The mobile application of the mobile device 160 is in communication with the logic controller 120 for commissioning an HVAC system, such as expedited commissioning of the variable frequency drive controller 150 via the mobile device 160 and the logic controller 120 for monitor and control of the fan of the rooftop unit 110.

The first portion 300 of the example process provides establishing a unit type configuration based on a type of HVAC system and at least one of temperature data, humidity data, or indoor air quality data. After the mobile application of the mobile device 160 is initiated (302) and the unit type configuration is activated (304), the mobile application detects, via a user interface of the mobile device or automated detection system of the environmental control system 100, whether the type of HVAC system is a conventional system (306), a heat pump system (308), or a combination of these systems (310). For the detected type of HVAC system, the mobile device detects zone monitoring information (312-316) based on room unit of the associated zone 318-322. The zone monitoring information (312-316) includes one ore more of a zone temperature data, a zone humidity data, or a zone indoor air quality data. The room units 318-322 monitor one or more of temperature, humidity, or carbon dioxide of the zone, with or without a display. Upon completion of establishing the unit type configuration, the mobile application may activate one or more of the other configurations, such as the fan configuration (324).

Figure 4A:
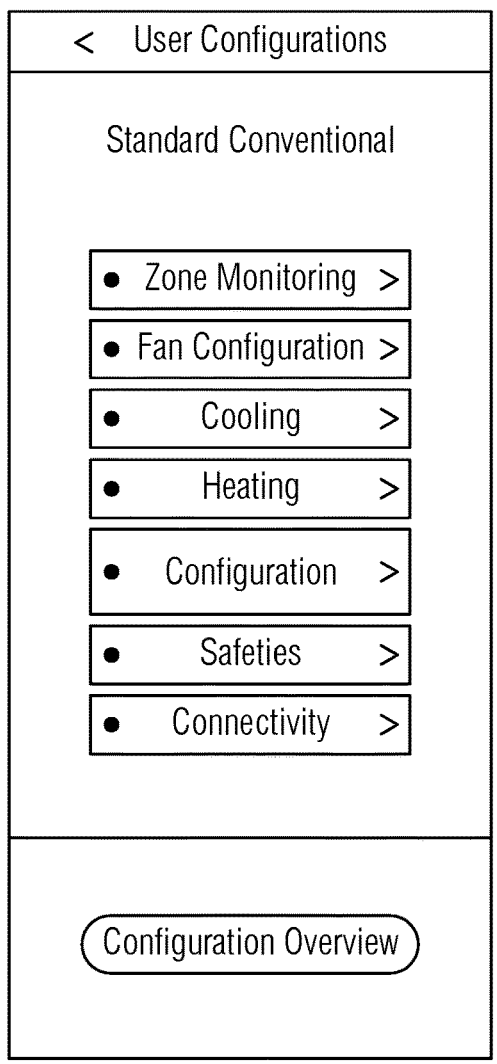
FIGS. 4A and 4B are screen views illustrating certain operations of FIG. 3.
Figure 4B:
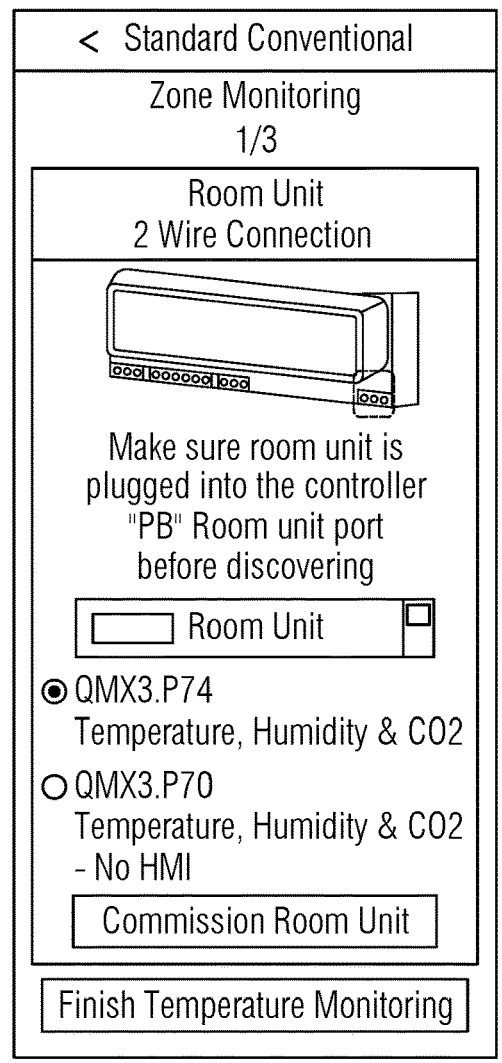

Referring to FIGS. 4A and 4B, there are shown screen views illustrating certain operations of FIG. 3. FIG. 4A illustrates a example user configuration screen 400 and provides access to configurations that may be detected, via a user interface of the mobile device or automated detection system of the environmental control system 100, including zone monitoring of the unit type configuration, fan configuration, cooling and heating configurations, and supplemental configurations. The example user configuration screen 400 also provides access to assignment of one or more safeties as well as operation settings of the mobile application, such as connectivity settings. FIG. 4B illustrates an example zone monitoring screen 450 of the unit type configuration in which a room unit for the zone monitoring may be detected by the mobile application.

Figure 5:
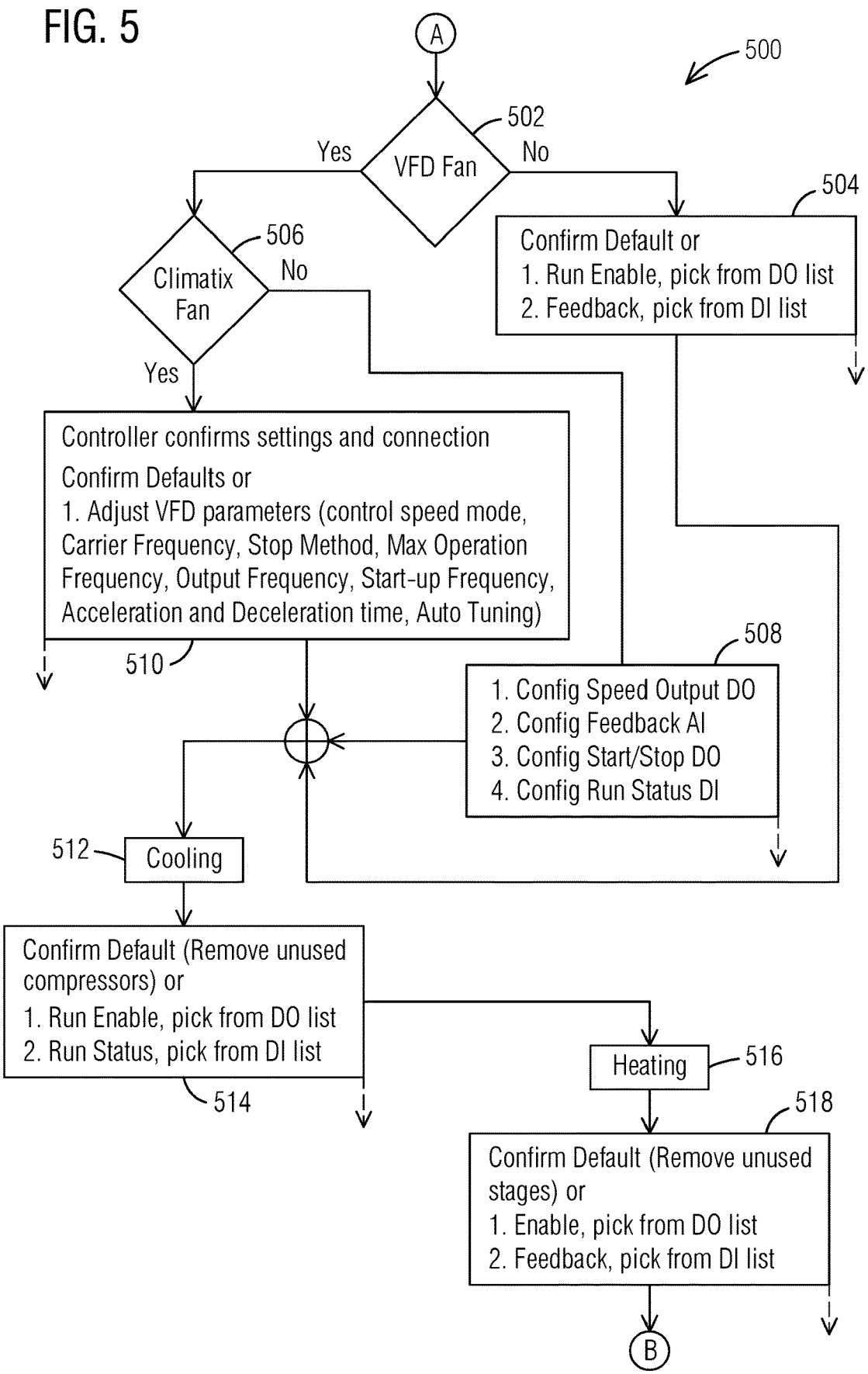
FIG. 5 is a flow diagram of a second portion of the example process of the mobile application executed by the mobile device of FIG. 1.

Referring to FIG. 5, there is shown a flow diagram of a second portion 500 of the example process of the mobile application executed by the mobile device. The second portion 500 of the example process provides for establishing a fan configuration (324 of FIG. 3) based on whether a variable frequency drive fan is identified. For one embodiment, the HVAC unit may not include a variable frequency device fan so the fan configuration may be established based on a traditional stage blower fan (504). In such case, the mobile application may identify a number of speeds, digital output, and digital input of the traditional stage blower fan. For another embodiment, the HVAC unit may include a variable frequency device fan so the fan configuration may be established based on a variable frequency drive fan. In such case, the mobile application detects whether the variable frequency drive fan is associated with a Modbus Drive (506). If the variable frequency driver is not associated with a Modbus Drive, then a frequency output value and a start/stop value of the variable frequency drive fan are identified (508). If the variable frequency drive fan is associated with a Modbus Drive, then the variable frequency drive parameters are identified (510). Examples of variable frequency driver parameters include control speed mode, carrier frequency, stop method, max operation frequency, output frequency, start-up frequency, acceleration and deceleration time, and auto tuning.

The second portion 500 of the example process also provides establishing cooling and heating stage configurations based on at least one compressor parameter and at least one heating stage parameter. The cooling stage configuration may be initiated (512), and the digital outputs and digital inputs of the cooling stage may be identified (514). The heating stage configuration may be initiated (516), and the digital outputs and digital inputs of the heating stage may be identified (518).

Figures 6A, 6B:
Figure 6E:
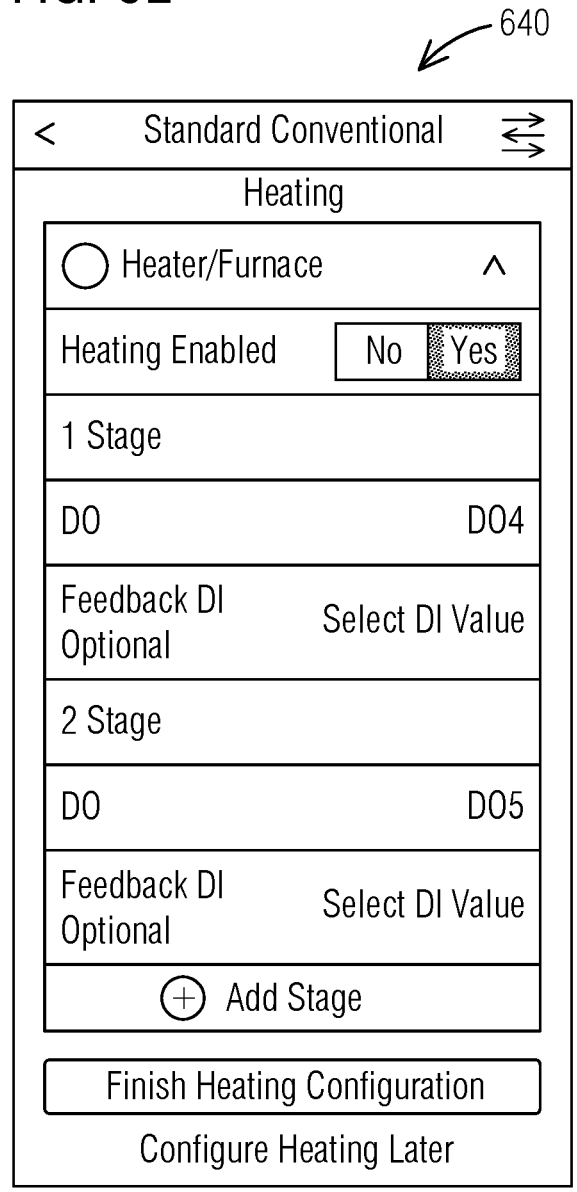

Referring to FIGS. 6A through 6E, there are shown screen views illustrating certain operations of FIG. 5. FIG. 6A illustrates an example fan configuration screen 600 in which the mobile application may detect, via a user interface of the mobile device or automated detection system of the environmental control system 100, a traditional stage blower fan or a variable frequency drive fan. In the case of a variable frequency drive fan, the mobile application may detect whether a Modbus Drive is identified. FIG. 6B illustrates an example variable frequency drive parameters screen 610 including, but not limited to, control of speed mode, carrier frequency, stop method, max operation frequency, output frequency, start-up frequency, output voltage, acceleration time, and deceleration time, and auto tuning. FIG. 6C illustrates an example compressor parameters screen 620 for the cooling configuration in which the number of compressors and the digital output and/or input of each compressor may be identified. FIG. 6D illustrates an example cooling settings screen 630 based on time (such as minutes) including, but not limited to, stage cooling delay, compressor minimum on, compressor minimum off, and economizer delay. FIG. 6E illustrates an example heating configuration screen 640 which identifies whether heating is enabled and a number of stages if heating is enabled. For each heating stage, the digital output and/or input of each heating stage may be identified.

Figure 7:
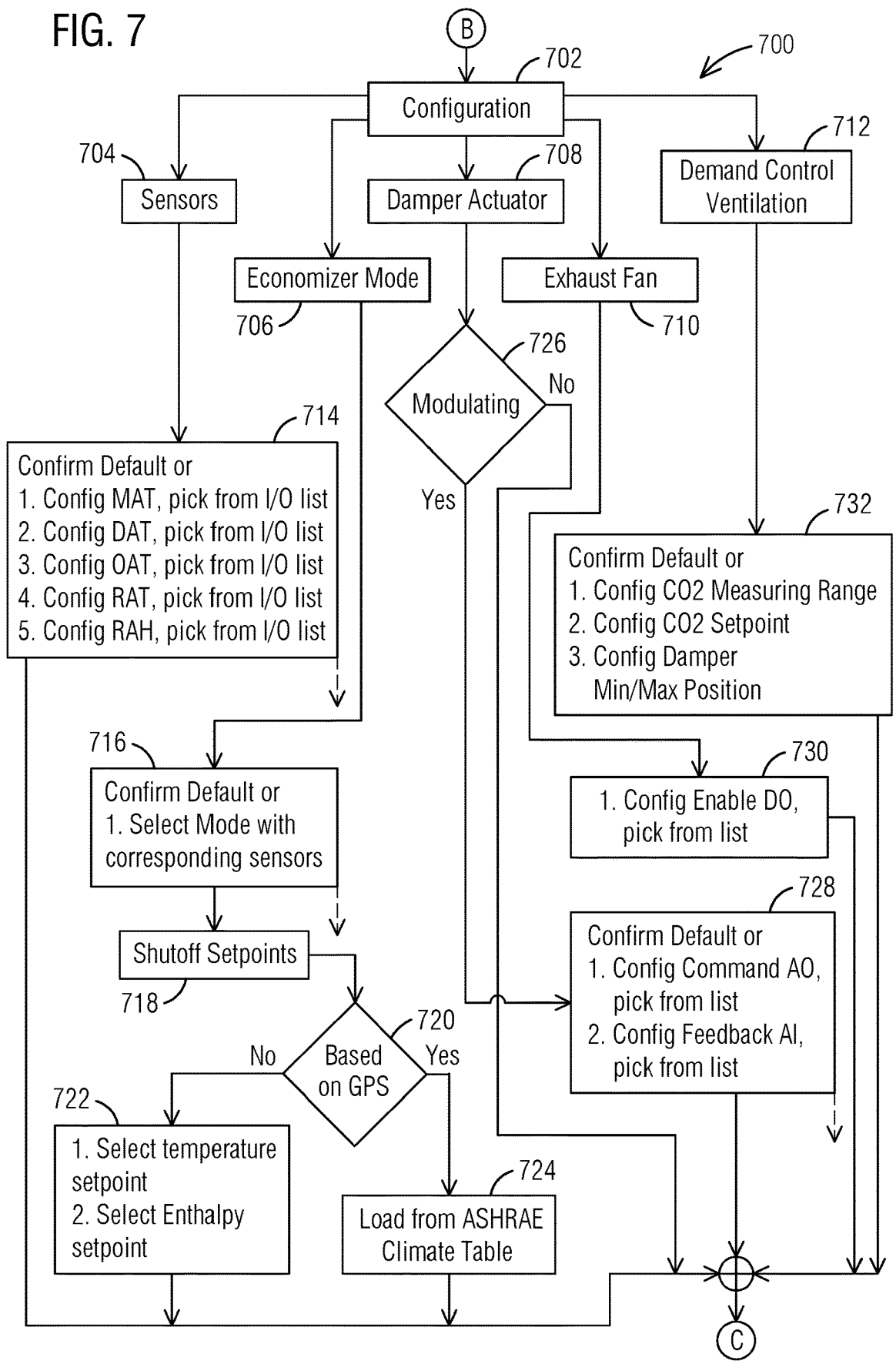
FIG. 7 is a flow diagram of a third portion of the example process of the mobile application executed by the mobile device of FIG. 1.

Referring to FIG. 7, there is shown a flow diagram of a third portion 700 of the example process of the mobile application executed by the mobile device.

The third portion 700 of the example process provides establishing at least one supplemental configuration. Upon activation of the supplemental configuration (702), the mobile application may detect or otherwise identify, via a user interface of the mobile device or automated detection system of the environmental control system 100, one or more of a sensor mode (704), an economizer mode (706), a damper actuator mode (708), an exhaust fan mode (710), and/or a demand control ventilation (712). For the sensor mode (704), the mobile application may identify the mixed air temperature, discharge air temperature, outside air temperature, room air temperature, and/or room air humidity (714). For the economizer mode (706), the mobile application may associate corresponding sensors with the mode (716) and identify shutoff setpoints (718). The mobile application may also utilize Global Positioning System ("GPS") functionality (720) for the shutoff setpoints based on a climate table, such as an ASHRAE and Title 24 (724). In the alternative, the mobile application may proceed without the GPS functionality by identifying a temperature setpoint and enthalpy setpoint (722). For the damper actuator mode (708), where modulating is identified (726), the mobile application may identify command AO (output) and feedback AI (input) (728). For the exhaust fan mode (710), the mobile application may identify a digital output (730). For the demand control ventilation ("DCV") (712), the mobile application may identify a carbon dioxide measuring range, a carbon dioxide setpoint, and/or a damper minimum/maximum position (732). For some embodiments, the mobile application may automatically setup demand control ventilation (712) to improve indoor air quality of the space.

Figure 8A:
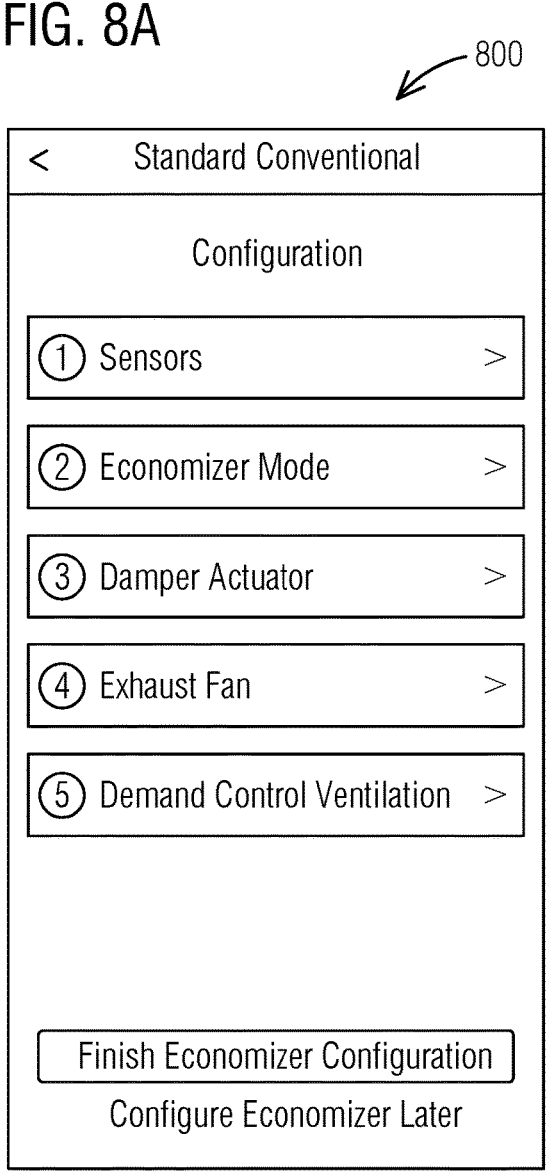
Figure 8B:
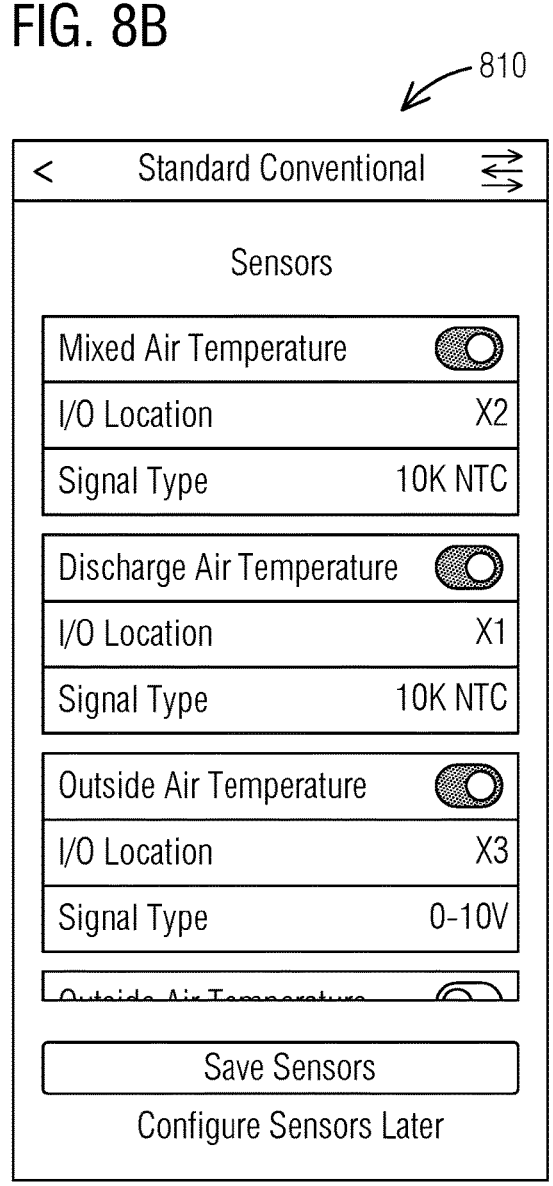
Figure 8E:
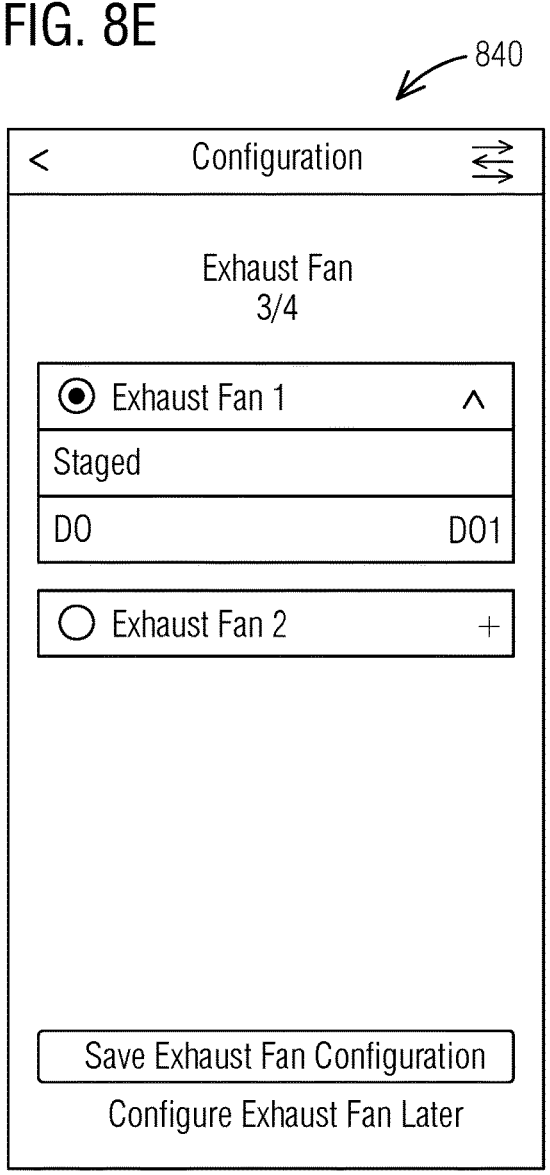
Figure 8F:
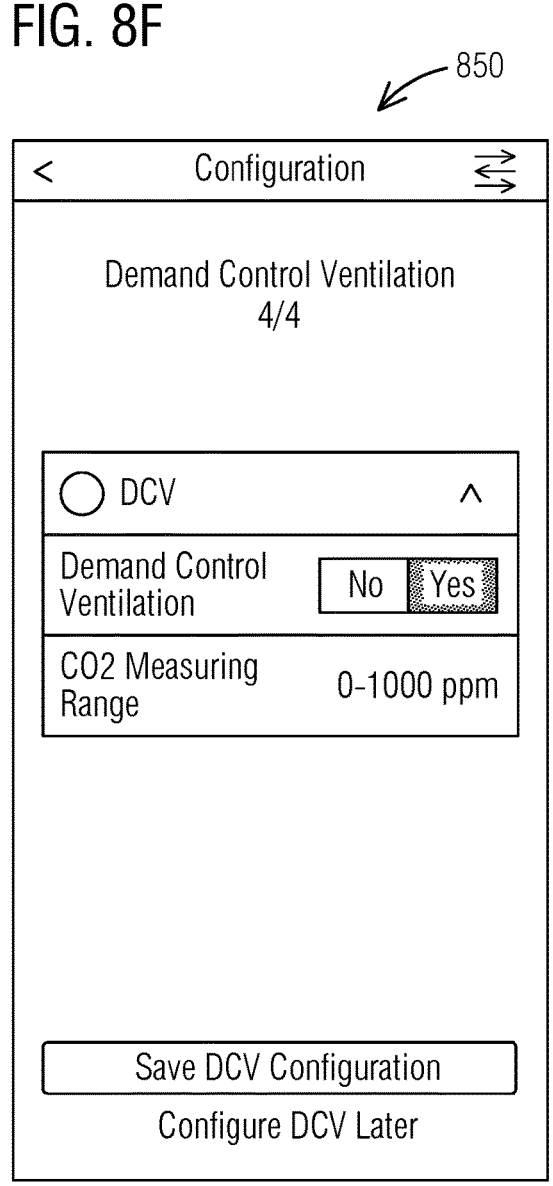

Referring to FIGS. 8A through 8F, there are shown screen views illustrating certain operations of FIG. 7. FIG. 8A illustrates an example supplemental configuration screen 800 in which the mobile application may detect or otherwise identify one or more of a sensors mode, an economizer mode, a damper actuator mode, an exhaust fan mode, and/or a demand control ventilation. FIG. 8B illustrates an example sensors mode screen 810 in which a mixed air temperature, a discharge air temperature, and/or an outside air temperature may be identified as well as their associated I/O locations and signal types. FIG. 8C illustrates an example economizer mode screen 820 in which an existence of an economizer, single or differential dry bulb, and/or single or differential enthalpy may be identified. FIG. 8D illustrates an example damper actuator mode screen 830 in which an existence of a damper actuator or modulating damper command signal AO and feedback AI may be identified. FIG. 8E illustrates an exhaust fan mode screen 840 in which one or more exhaust fans and their associated parameters are identified. FIG. 8F illustrates an example demand control ventilation mode screen 850 in which an existence of demand control ventilation may be identified.

Referring to FIG. 9, there is shown a flow diagram of a fourth portion 900 of the example process of the mobile application executed by the mobile device. The fourth portion 900 of the example process provides for assigning one or more safeties to the available auxiliary terminations in response to identifying the available auxiliary terminations. Examples of safeties which may be identified in response to activation of the safeties function (902) include, but are not limited to, a clog filter switch (904), a smoke detector (906), an emergency shutoff (908), a drain pan clog switch (910), a freeze protection (912), a pressure switch (914), or an alarm output (916). A digital input (918-928) may be identified for a clog filter switch (904), a smoke detector (906), an emergency shutoff (908), a drain pan clog switch (910), a freeze protection (912), a pressure switch (914), and a digital output (930) may be identified for an alarm output (916).

Based on the identification of one or more of the safeties, or activation of their functions, the mobile application may generate a result plot (932) which consolidates the results of these safeties. In addition, the result plot may be generated (932) to include the unit type configuration, the fan configuration, and the cooling and heating stage configuration as well as these safeties. For some embodiments, the result plot may be generated (932) to include the supplemental configuration as well as these other configurations and the safeties. For some embodiments, the mobile application may identify unavailable terminations of the HVAC controller in response to establishing the unit type configuration, the fan configuration, and the cooling and heating stage configuration. For some embodiments, the mobile application may identify one or more available auxiliary terminations in response to establishing the unit type configuration, the fan configuration, the cooling and heating stage configuration, and the supplemental configuration.

The fourth portion 900 of the example process also provides for generating or otherwise providing an IO table to an HVAC controller (934). The IO table including physical input/output assignments for the terminations of the HVAC controller based on the unit type configuration, the fan configuration, the cooling and heating stage configuration, the supplemental configuration, and/or the safeties. Thereafter, the mobile application may provide the user interface of the mobile device and/or a remote device such as the cloud device to verify and confirm the IO table (936) before ending the process (938). For some embodiments, a topology of the logic controller 120 and its associated components 130-170 may be generated from the result plot before ending the process (938).

Figure 10:
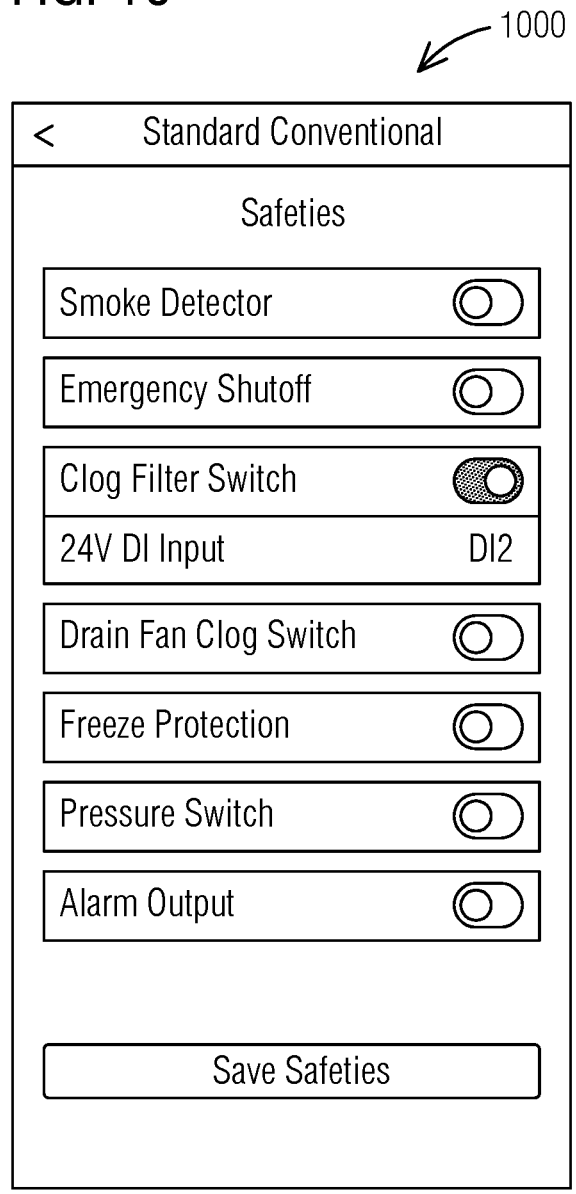
FIG. 10 is a screen view illustrating a certain operation of FIG. 9.

Referring to FIG. 10, there is shown a screen view illustrating a certain operation of FIG. 9. In particular, FIG. 10 illustrates a safeties screen in which one or more safeties may be assigned or otherwise allocated input/output terminations based on the auxiliary terminations available after establishing any or all of the configurations described above. Examples of safeties include, but are not limited to, a smoke detector, emergency shutoff, clog filter switch, drain pan clog switch, freeze protection, pressure switch, and/or alarm output.

Figure 11A:
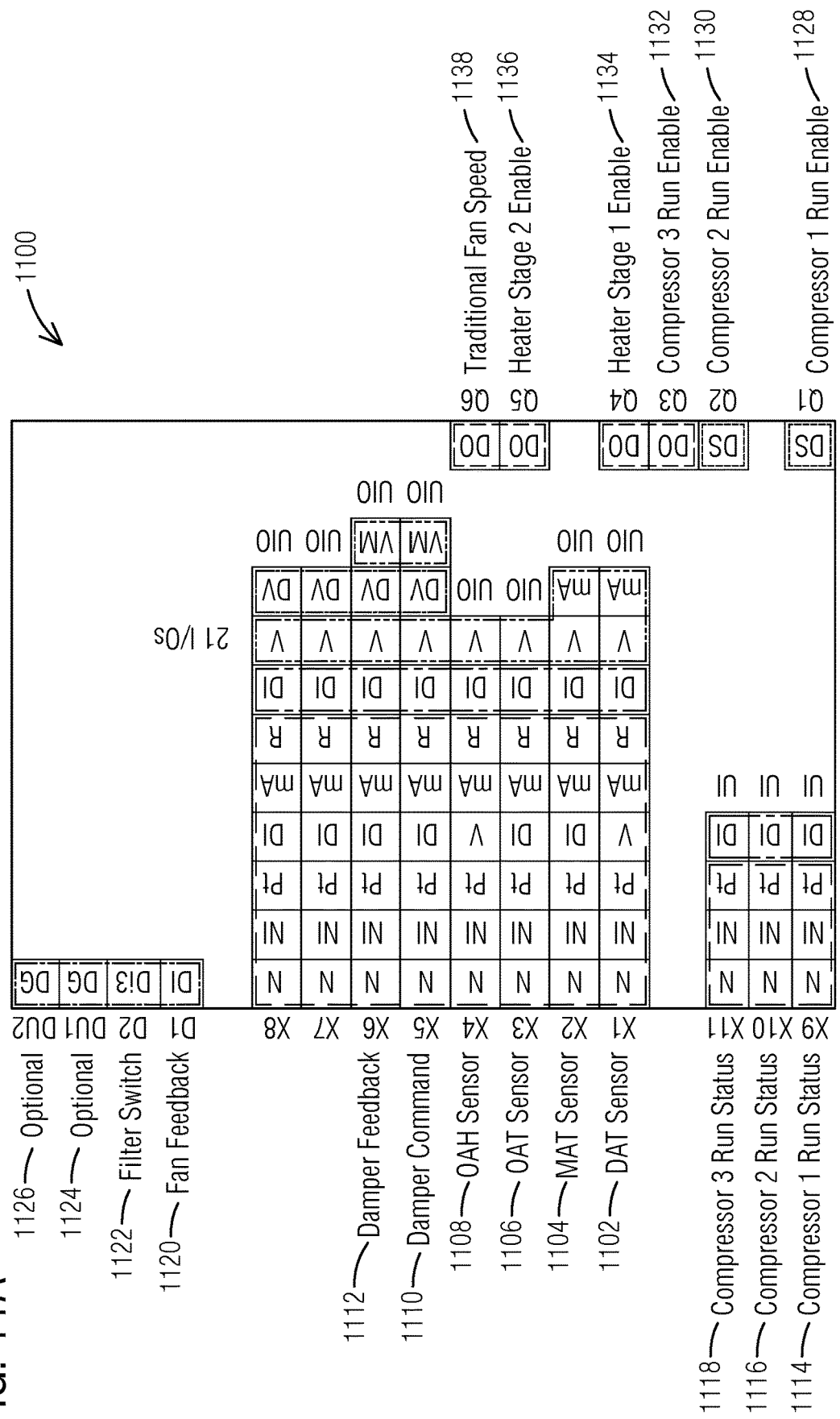
FIGS. 11A and 11B depict representations of example implementations of HVAC controllers having configurable inputs and outputs, operable to employ techniques described herein.
Figure 11B:
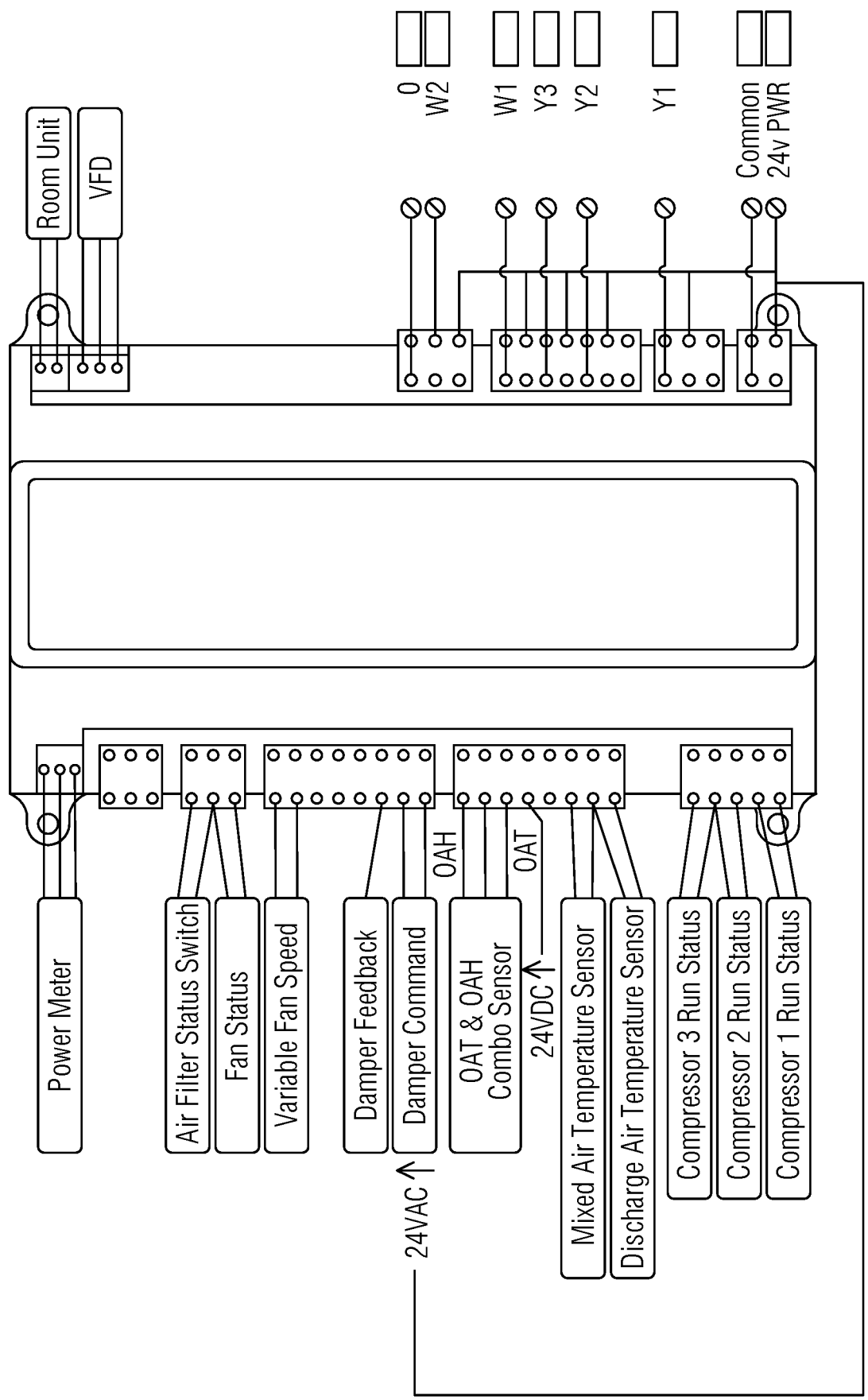

Referring to FIGS. 11A and 11B, there are depicted representations of example implementations of HVAC controllers having configurable inputs and outputs, operable to employ techniques described herein. The inputs and outputs are allocated based on the auxiliary terminations available after establishing any or all of the configurations. FIG. 11A illustrates examples of inputs and output terminations includes, but are not limited to, DAT sensor 1102, MAT sensor 1104, OAT sensor 1106, OAH sensor 1108, damper command 1110, damper feedback 1112, one or more compressor run statuses 1114-1118, fan feedback 1120, filter switch 1122, one or more optional terminations 1124-1126, one or more compressor run enable 1128-1132, heater stage 1 enable 1134, heater stage 2 enable 1136, and tradition fan speed 11138. receiving the IO table at the HVAC controller and configuring input/output terminations of the HVAC controller based on the physical input/out assignments of IO table. FIG. 11B illustrates similar inputs and output terminations for a top planar view of an actual images of a logic controller 120.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method for configuring, commissioning and troubleshooting an HVAC unit, the method comprising:
    establishing a unit type configuration based on a type of HVAC system and at least one of temperature data, humidity data, or indoor air quality data;
    establishing a fan configuration based on whether a variable frequency drive fan is identified;
    establishing cooling and heating stage configurations based on at least one compressor parameter and at least one heating stage parameter;
    identifying at least one available auxiliary termination in response to establishing the unit type configuration, the fan configuration, and the cooling and heating stage configuration;
    assigning at least one safety to the at least one available auxiliary termination in response to identifying the at least one available auxiliary termination;
    providing an IO table, the IO table including physical input/output assignments for input/output terminations based on at least one configuration and the assigned at least one safety; and
    receiving the IO table at the HVAC controller and configuring the input/output terminations of the HVAC controller based on the physical input/out assignments of IO table.

2. The method as described in claim 1, further comprising identifying a plurality of unavailable terminations of the HVAC controller in response to establishing the unit type configuration, the fan configuration, and the cooling and heating stage configuration.

3. The method as described in claim 1, further comprising establishing at least one supplemental configuration based on identification of at least one of a sensor, an economizer mode, a damper actuator, an exhaust fan, or a demand control ventilation,
    wherein identifying the at least one available auxiliary termination includes identifying the at least one available auxiliary termination in response to establishing at least one supplemental configuration as well as establishing the unit type configuration, the fan configuration, and the cooling and heating stage configuration.

4. The method as described in claim 1, wherein the at least one safety is selected from a group consisting of a clog filter switch, a smoke detector, an emergency shutoff, a drain pan clog switch, a freeze protection, a pressure switch, or an alarm output.

5. A system for configuring, commissioning and troubleshooting an HVAC unit comprising:
    a mobile device configured to:
        establish a unit type configuration based on a type of HVAC system and at least one of temperature data, humidity data, or indoor air quality data;
        establish a fan configuration based on whether a variable frequency drive fan is identified;
        establish cooling and heating stage configurations based on at least one compressor parameter and at least one heating stage parameter;
        identify at least one available auxiliary termination based on the unit type configuration, the fan configuration, and the cooling and heating stage configuration;
        assign at least one safety to the at least one available auxiliary termination based on the at least one available auxiliary termination; and
        provide an IO table including physical input/output assignments for input/output terminations based on at least one configuration and the assigned at least one safety; and
    an HVAC controller receiving the IO table and configuring the input/output terminations of the HVAC controller based on the physical input/out assignments of IO table.

6. The system as described in claim 5, wherein the mobile device identifies a plurality of unavailable terminations of the HVAC controller based on the unit type configuration, the fan configuration, and the cooling and heating stage configuration.

7. The system as described in claim 5, wherein:
    the mobile device establishes at least one supplemental configuration based on identification of at least one of a sensor, an economizer mode, a damper actuator, an exhaust fan, or a demand control ventilation, and
    the mobile device identifies the at least one available auxiliary termination based on at least one supplemental configuration as well as the unit type configuration, the fan configuration, and the cooling and heating stage configuration.

8. The system as described in claim 5, wherein the at least one safety is selected from a group consisting of a clog filter switch, a smoke detector, an emergency shutoff, a drain pan clog switch, a freeze protection, a pressure switch, or an alarm output.

* * * * *